(12) United States Patent
Hall et al.

(10) Patent No.: US 11,118,283 B2
(45) Date of Patent: Sep. 14, 2021

(54) SEQUENCED PULSE REVERSE WAVEFORM SURFACE FINISHING OF ADDITIVELY MANUFACTURED PARTS

(71) Applicant: Faraday Technology, Inc., Englewood, OH (US)

(72) Inventors: Timothy D. Hall, Englewood, OH (US); Holly M. Garich, Fairborn, OH (US); Heather McCrabb, Kettering, OH (US); Earl Jennings Taylor, Troy, OH (US)

(73) Assignee: Faraday Technology, Inc., Englewood, OH (US)

( * ) Notice: Subject to any disclaimer, the term of this patent is extended or adjusted under 35 U.S.C. 154(b) by 19 days.

(21) Appl. No.: 16/774,232

(22) Filed: Jan. 28, 2020

(65) Prior Publication Data

US 2020/0318253 A1   Oct. 8, 2020

Related U.S. Application Data

(60) Provisional application No. 62/829,191, filed on Apr. 4, 2019.

(51) Int. Cl.
  *C25F 3/16* (2006.01)
  *C25F 7/00* (2006.01)
  *B33Y 40/20* (2020.01)

(52) U.S. Cl.
  CPC ............... *C25F 3/16* (2013.01); *B33Y 40/20* (2020.01); *C25F 7/00* (2013.01)

(58) Field of Classification Search
  CPC .................................... C25F 3/02; C25F 3/16
  See application file for complete search history.

(56) References Cited

U.S. PATENT DOCUMENTS 3,654,116 A   4/1972   Inoue
6,402,931 B1  6/2002   Zhou et al.
(Continued)

OTHER PUBLICATIONS

H. Garich et al., "Electrochemical Surface Finishing of Additively Manufactured Parts", Faraday Technology, Inc., 233rd ECS meeting, Seattle, WA, May 16, 2018, Thirteen (13) pages.

*Primary Examiner* — Brian W Cohen
(74) *Attorney, Agent, or Firm* — Iandorio Teska & Coleman, LLP

(57) ABSTRACT

A method of and system for surface finishing an additive manufactured part. A part having a surface roughness with macroasperities is placed in a chamber with an electrolyte and an electrode. A pulse/pulse reverse power supply is connected to the part rendering it anodic and connected to the electrode rendering it cathodic. The power supply is operated to decrease the surface roughness of the part by applying a first series of waveforms including at least two waveforms where a diffusion layer is maintained at a thickness to produce a macroprofile regime relative to the macroasperities, the first series of waveforms having anodic voltages applied for anodic time periods before cathodic voltages applied for cathodic time periods to effect part surface smoothing to a first surface roughness with minimal material removal and applying a final waveform where the diffusion layer represents a microprofile regime, the final waveform having a final anodic voltage applied for a final anodic time period before a final cathodic voltage applied for a final cathodic time period to effect part surface smoothing to a final surface roughness with minimal material removal.

3 Claims, 10 Drawing Sheets

(56) References Cited

U.S. PATENT DOCUMENTS

| | | |
|---|---|---|
| 6,558,231 B1 | 5/2003 | Taylor |
| 7,022,216 B2 | 4/2006 | Taylor et al. |
| 9,006,147 B2 | 4/2015 | Taylor et al. |
| 9,192,999 B2 | 11/2015 | Carter et al. |
| 9,782,829 B2 | 10/2017 | Morris et al. |
| 2019/0292681 A1* | 9/2019 | Bagehorn ................ C25F 3/16 |

* cited by examiner $\delta_p$ - THICKNESS OF PULSATING DIFFUSION LAYER
$\delta_s$ - THICKNESS OF STATIONARY DIFFUSION LAYER
$\delta_H$ - THICKNESS OF HYDRODYNAMICALLY ESTABLISHED NERNST DIFFUSION LAYER UNDER DC CONTROL

SEQUENCED PULSE REVERSE WAVEFORM SURFACE FINISHING OF ADDITIVELY MANUFACTURED PARTS

RELATED APPLICATIONS

This application claims benefit of and priority to U.S. Provisional Application Ser. No. 62/829,191 filed Apr. 4, 2019, under 35 U.S.C. §§ 119, 120, 363, 365, and 37 C.F.R. § 1.55 and § 1.78, which is incorporated herein by this reference.

FIELD OF THE INVENTION

This subject invention relates to high rate electrochemical surface finishing of metal parts.

BACKGROUND OF THE INVENTION

Metal additive manufacturing (AM) or three-dimensional (3-D) manufacturing processes have the potential to revolutionize the art of manufacturing complex components enabling a build to print scenario. Herein, AM and 3-D are used interchangeably to describe these manufacturing processes. One type of additive manufacturing is the powder bed fusion (PBF) process which includes the following commonly used printing techniques: Direct Metal Laser Sintering (DMLS), Electron Beam Melting (EBM), Selective Heat Sintering (SHS), Selective Laser Melting (SLM) and Selective Laser Sintering (SLS).

PBF methods use either a laser or electron beam to melt and fuse material powder together. EBM methods require a vacuum but can be used with metals and alloys in the creation of functional parts. All PBF processes involve the spreading of the powder material over previous layers. There are different mechanisms to enable this including a roller or a blade. A hopper or a reservoir below or adjacent the bed provides fresh material supply. DMLS is the similar to SLS, but with the use of metals and not plastics. The process sinters the powder layer by layer. SHS differs from other processes by using a heated thermal print head to fuse powder material together. As before, layers are added with a roller in between fusion of layers. A platform lowers the part accordingly.

The PBF process steps generally include a layer, typically 0.05 to 0.25 mm thick of material spread over the build platform. A laser or electron beam then fuses the first layer or first cross section of the model. A new layer of powder is spread across the previous layer using a rake. Further layers or cross sections are fused and added. Then the process repeats until the entire part is created. Loose, unfused or partially sintered powder remains in position but is removed during post processing.

Other metal additive manufacturing processes use different feedstock forms for the supply material. These processes generally include Wire Directed Energy Deposition such as Laser Metal Deposition-wire (LDM-w) and Powder Directed Energy Deposition such as Laser Engineering Net Shape (LENS), Laser Metal Deposition-powder (LMD-p).

Metal additive manufacturing processes can cause microstructural anisotropy/inhomogeneity, porosity (open near the surface and closed internally), surfaces with partially sintered materials and large surface roughness. Therefore, at the completion of the metal additive manufacturing process, the resulting parts are commonly hot isostatically pressed (HIPped) to eliminate sub surface (enclosed) porosity and machined or otherwise finished to eliminate any partially consolidated surface material or near surface porosity from the surface. This surface porosity can be detrimental to the material performance of a wide range of applications and must be removed prior to material usage.

BRIEF SUMMARY OF THE INVENTION

Provided is an improved surface finish method and system of three-dimensional (3-D) additively manufactured (AM) parts and components made from powder bed fusion process including direct metal laser sintering (DMLS), electron beam melting (EBM), selective heat sintering (SHS), selective laser melting (SLM) and selective laser sintering (SLS) or wire directed energy deposition such as laser metal deposition-wire (LDM-w) and powder directed energy deposition such as laser engineering net shape (LENS), and laser metal deposition-powder (LMD-p). In addition to large surface roughness, parts made from 3-D/AM processes generally contain an unacceptable high surface porosity even after HIPed. A large surface roughness is electrochemically finished to an acceptable surface roughness whereby the surface may include both exterior and interior surfaces. Preferably, a first set of waveform parameters are tuned to achieve surface smoothing from a predetermined first starting surface roughness to a first final surface roughness with minimal material removal. Then, a second set of waveform parameters are tuned to achieve surface smoothing from said first final surface roughness to a second final surface roughness with minimal material removal. The waveform may be tuned or sequenced a sufficient number of times to achieve the desired final surface finish with minimal material removal.

The preferred method includes high rate electrochemical surface finishing of internal and external surfaces of metal parts and components with highly rough and/or porous surfaces. The process is applied to additively manufactured metal parts with highly rough initial surfaces to a final roughness encompassing a wide range of roughness values.

The process can be applied to high rate electrochemical surface finishing of additively manufactured metal parts made from alloys including INCONEL 718, HASTELLOY® X, Ti6Al4V, and other materials.

The surface roughness (Ra) is reduced while at the same time the amount of material removed is minimized. Large surface disparities are removed and other processes, like vibratory finishing, can be used to remove finer surface disparities.

Consequently, the surface (internal and external) porosity and roughness of additive manufactured metal parts and components are improved in an efficient and cost-effective manner while minimizing the amount of material removed.

In some embodiments, the instant invention addresses the problem of surface finishing of additively manufactured metal parts and components with a large initial roughness by tuning a first set of waveform parameters to effect surface smoothing to a predetermined first final surface roughness with minimal material removal. Next, the waveform is sequenced to a second set of waveform parameters to achieve surface smoothing from said first final surface roughness to a second final surface roughness with minimal material removal. And still next, the waveform is sequenced to a third set of waveform parameters to achieve surface smoothing from said second final surface roughness to a third final surface roughness with minimal material removal. The waveform is sequenced a sufficient number of times until the macro- and/or microasperities are removed to achieve the desired final surface finish with minimal material removal.

See also U.S. Pat. Nos. 6,402,931; 6,558,231; 7,022,216; 9,006,147; and 9,987,699, all of which are incorporated herein by this reference.

In one embodiment of the invention, the initial surface roughness of an additively manufactured powder bed fusion metal part or component is at least 50 microns (2000 microinches). In another embodiment of the invention, the initial surface roughness of an additively manufactured powder bed fusion metal part or component is at least 25 microns (1000 microinches). Instill another embodiment of the invention, the initial surface roughness of an additively manufactured powder bed fusion metal part or component is at least 5 microns (200 microinches). In still another embodiment of the invention, the reduction in surface roughness of an additively manufactured powder bed fusion metal part or component from initial roughness to final roughness after sequenced pulse reverse waveform electrofinishing is at least 10x. In still another embodiment of the invention, the reduction in surface roughness of an additively manufactured powder bed fusion metal part or component from initial roughness to final roughness after sequenced pulse reverse waveform electrofinishing is at least 5x. In still another embodiment of the invention, the reduction in surface roughness of an additively manufactured powder bed fusion metal part or component from initial roughness to final roughness after sequenced pulse reverse waveform electrofinishing is at least 3x. In still another embodiment of the invention, the surface of an additively manufactured powder bed fusion metal part or component is an internal surface and the frequency is adjusted such that a maximum of internal surface is smoothed. In still another embodiment of the invention, a finishing process can be used to reduce the overall roughness of the additively manufactured powder bed fusion metal part can be used to accelerate finishing or front-end other finishing processes like, vibratory finishing.

Featured is a method of and system for surface finishing an additive manufactured part one preferred method includes placing the part having a surface roughness with macroasperities in the chamber with an electrolyte and an electrode, connecting a pulse/pulse reverse power supply to the part rendering it anodic and to the electrode rendering it cathodic, and operating the power supply to decrease the surface roughness of the part. A first series of waveforms are applied including at least two waveforms where a diffusion layer is maintained at a thickness to produce a macroprofile regime relative to the macroasperities, the first series of waveforms having anodic voltages applied for anodic time periods before cathodic voltages applied for cathodic time periods to effect part surface smoothing to a first surface roughness with minimal material removal. A final waveform is applied where the diffusion layer represents a microprofile regime, the final waveform having a final anodic voltage applied for a final anodic time period before a final cathodic voltage applied for a final cathodic time period to effect part surface smoothing to a final surface roughness with minimal material removal. The first series of waveform times may be between 1 millisecond and 100 milliseconds, and the final waveform time may be between 1 millisecond and 100 milliseconds. The anodic voltages are preferably between 3 volts and 40 volts. The first series of waveform anodic time periods are preferably between 0.1 millisecond and 50 millisecond and the final anodic time period is preferably between 50 milliseconds and 100 milliseconds. The cathodic voltages are preferably between 4 volts and 30 volts. The cathodic time periods may, in one embodiment, replace at least some or all of the off-times between the anodic times. The first surface roughness is preferably between 5 microns and 50 microns, the final surface roughness is preferably between 0.5 microns and 15 microns and the total amount of material removed is preferably between 50 microns and 250 microns.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
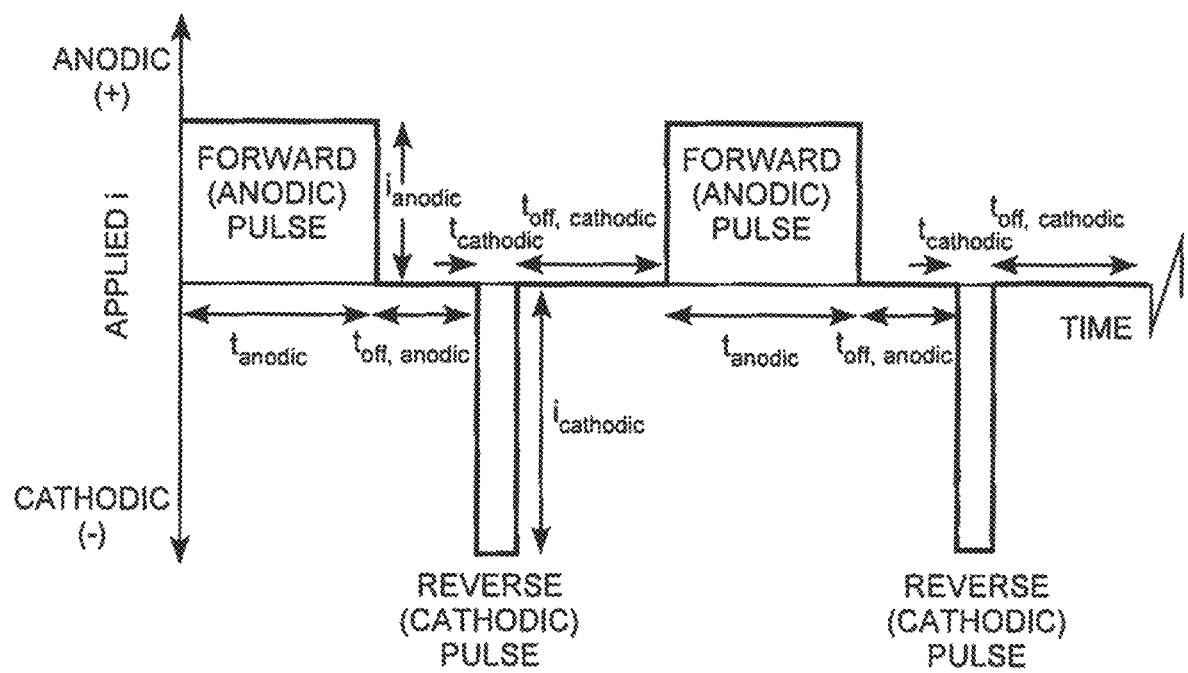
FIG. 1 is a generalized pulse revere waveform.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows a generic pulse reverse current waveform for a net anodic or electrofinishing process. The generic description illustrates a anodic (forward) pulse followed by an anodic off-time, followed by an cathodic (reverse) pulse and followed by an cathodic off-time. The anodic peak current density ($i_{anodic}$), anodic on-time ($t_{anodic}$), and anodic off-time ($t_{off,anodic}$) cathodic peak current density ($i_{cathodic}$), cathodic on-time ($t_{cathodic}$), cathodic off-time ($t_{off,cathodic}$), are individual variables for process control. While the terminology pulse/pulse reverse current is often employed, the waveforms are often controlled in terms of the voltage and could also be termed pulse/pulse reverse voltage. The sum of the anodic on-time, anodic off-time, cathodic on-time, and cathodic off-time(s) is the period (T) of the pulse and the inverse of the period is the frequency (f). Specifically, $$T=(t_{anodic})+(t_{off,anodic})+(t_{cathodic})+(t_{off,cathodic}) \quad (1)$$

$$f=(1/T) \quad (2)$$

The anodic duty cycle ($\gamma_{anodic}$) is the ratio of the anodic on-time to the pulse period, and the ratio of the cathodic on-time to the pulse period is the cathodic duty cycle ($\gamma_{cathodic}$). The frequency and duty cycles are additional variables for process control. The average current density ($i_{average}$) or electrofinishing rate is given by:

$$i_{average}=(i_{anodic})(\gamma_{anodic})-(i_{cathodic})(\gamma_{cathodic}) \quad (3)$$

It should be noted that even though pulse current and pulse reverse current (PC/PRC) waveforms contain off-times and anodic periods, the net electrofinishing rate is often the same or higher than in direct current (DC) processing. As discussed below, this is attributed to the fact that the "instantaneous" peak currents attained during the pulse on-time can be much higher than that attained during DC processing.

Figure 2:
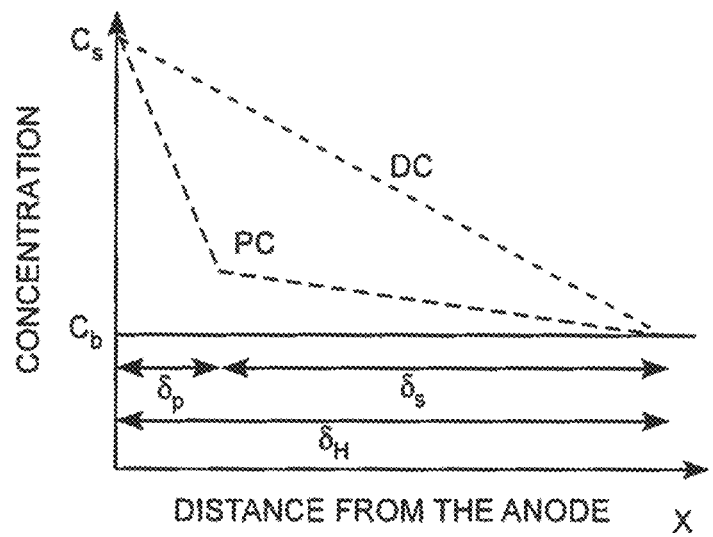
FIG. 2 is a representation delineating the pulsating versus stationary diffusion layer for an anodic process.

Mass transport in pulse current processing is a combination of steady state and non-steady state diffusion processes. The mass transfer limited current density ($i_l$) is related to the reactant concentration gradient ($C_b-C_s$) and to the diffusion layer thickness ($\delta$) by:

$$i_l=-nFD(\partial C/\partial x)_{x=0}=-nFD[(C_b-C_x)/\delta] \quad (4)$$

where n, F, D are the number of equivalents exchanged, Faraday's constant, and diffusivity of the reacting species, respectively. In DC electrolysis, $\delta$ is a time-invariant quantity for a given electrode geometry and hydrodynamic condition. In pulsed electrolysis, however, $\delta$ varies from 0 at the beginning of the pulse to its steady state value when the Nernst diffusion layer, $\delta_N$, is fully established. The corresponding mass transport limiting current density is equal to an infinite value at t=0 and decreases to a steady state value of the DC limiting current density. The advantage of pulse electrolysis is that the current is interrupted before $\delta$ reaches steady state, allowing the dissolved ions to diffuse away from the surface and partially or completely reduce the surface concentration before the next current interruption. Therefore, the concentration of dissolved ions in the vicinity of the electrode changes with the pulse frequency. During pulse electrolysis, a "duplex diffusion layer" includes a pulsating layer, $\delta_p$, and a stationary layer, $\delta_s$ for a deposition process. FIG. 2 shows the equivalent diffusion layers for an anodic process, e.g. metal removal. By assuming a linear concentration gradient across the pulsating diffusion layer and conducting a mass balance, the pulsating diffusion layer thickness ($\delta_p$) is:

$$\delta_p \sim (2Dt_{on})^{1/2} \quad (5)$$

where $t_{on}$ is the pulse on-time. When the pulse on time is equal to the transition time, the concentration of reacting species at the interface drops to zero at the end of the pulse. An expression for the transition time, $\tau$, is:

$$\tau \sim ((nF)^2 C_b^2 D)/2i_c^2 \quad (6)$$

For on-times less than the transition time, the concentration of dissolving species at the interface is low. For on-times equal to or greater than the transition time, the concentration of reacting species is high and mass transport becomes an important consideration.

For a DC process, a hydrodynamic Nernst diffusion layer is established. The thickness of the pulsating diffusion layer is related to the pulse current on-time and we refer to it as the "electrodynamic" diffusion layer. The key points used in the development of a pulsed process for electrodeposition are:

(1) the electrodynamic diffusion layer thickness is proportional to pulse on time, and (2) transition time is inversely proportional to the pulse current.

Current distribution is an important parameter in electrochemical surface finishing processes. Primary current is governed solely by the geometric effects of the electrochemical cell. Secondary current distribution is governed by kinetic effects and activation overpotentials are considered. Tertiary current distribution is governed by mass transport effects and both activation and concentration overpotentials are considered. The addition of secondary or tertiary current distribution effects tend to make the current distribution more uniform, as compared to primary current distribution alone. In the case of surface finishing to reduce surface roughness, the current distribution should be focused on the peaks or asperities in order to preferentially remove the surface roughness.

Another important consideration is the relationship between the thickness of the hydrodynamic diffusion layer and the surface asperities. For a given electrolyte, the thickness of the hydrodynamic diffusion layer is determined by the degree of solution agitation in the electrochemical cell. Specifically, with high solution agitation the thickness of the hydrodynamic diffusion layer is smaller than the case of low solution agitation. The degree of solution agitation is determined by factors understood by those skilled in the art and include solution flow rate, stir bars and paddles, and the like. For a given electrochemical cell, the solution agitation is generally constant and consequently the thickness of the hydrodynamic diffusion layer is constant during surface finishing of the workpiece.

Figure 3:
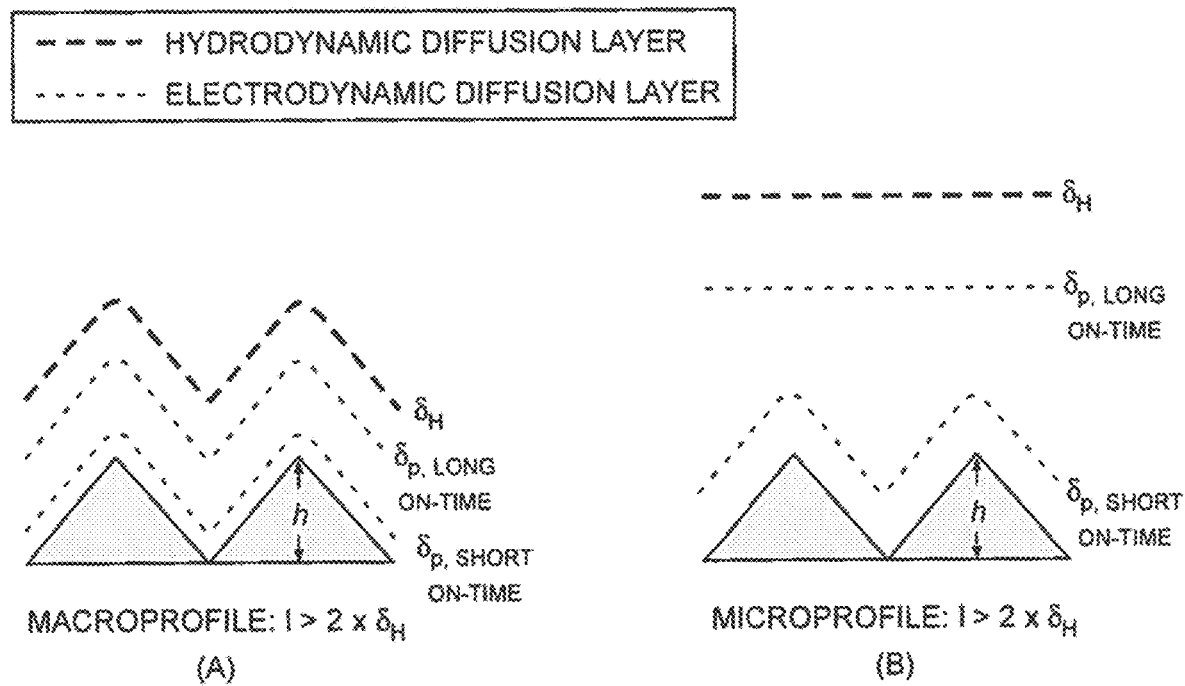
FIGS. 3A and 3B are a representation of the impact of long and short pulse on-times under conditions of macroprofile (FIG. 3A) and microprofile (FIG. 3B)

In a macroprofile (FIG. 3A), the roughness of the surface is large compared with the thickness of the hydrodynamic diffusion layer, $\delta_H$, and when a pulsed electric field is applied, the diffusion layer is compressed to form a pulsating or electrodynamic diffusion layer, $\delta_p$. The pulsating diffusion layer, $\delta_p$, tends to follow the surface contour, and becomes more compressed and thinner as the pulse on-time becomes shorter. In a microprofile (FIG. 3B), the roughness of the surface is small compared with the thickness of the hydrodynamic diffusion layer, $\delta_H$. In this case, for a long pulse on-time, the pulsating diffusion layer is compressed, but still is much larger than the characteristic length, and the microprofile is maintained. For very short pulse on-times, the pulsating diffusion layer is compressed to the point at which it follows the surface contour, and the system effectively mimics a macroprofile.

A final consideration is that if the applied waveform is designed such that the pulse on time is much longer than the transition time, tertiary current distribution will play an important role. With the addition of tertiary control, the concepts of macroprofile and microprofile and their influence on current distribution become important. Under DC conditions and mass transport control, a macroprofile results in the most uniform current distribution and a nearly conformal surface finishing profile. In other words, the surface roughness remains the same and is not reduced. The application of pulse currents generates a smaller macroprofile. Based on experimental observations, for a macroprofile boundary layer condition, relatively long pulse on-times can yield a slightly non-uniform current distribution compared to DC conditions, and relatively short pulse on-times can yield a significantly more non-uniform current distribution than DC conditions. Assuming the same average current, for shorter pulse on-times the relative influence on current distribution shifts from tertiary current distribution control to secondary as well as primary current distribution control. Consequently, as concentration polarization effects are removed, the current distribution becomes less uniform.

Under DC conditions and mass transport control, a microprofile results in the most non-uniform current distribution and a preferential removal of the surface asperities. The application of pulse currents with a small enough on-time can convert a microprofile to a macroprofile, establishing a small $\delta_p$. For a microprofile diffusion layer condition, assuming tertiary current distribution control is maintained, short pulse on-times sufficient to convert the microprofile to a macroprofile results in a significantly more uniform current distribution. Conversely, long pulse on-times sufficient to maintain the microprofile results in a slightly more uniform current distribution compared to DC, assuming tertiary control is maintained by selecting on-times and peak currents that ensure $t_{on} \gg \tau$.

Figure 4:
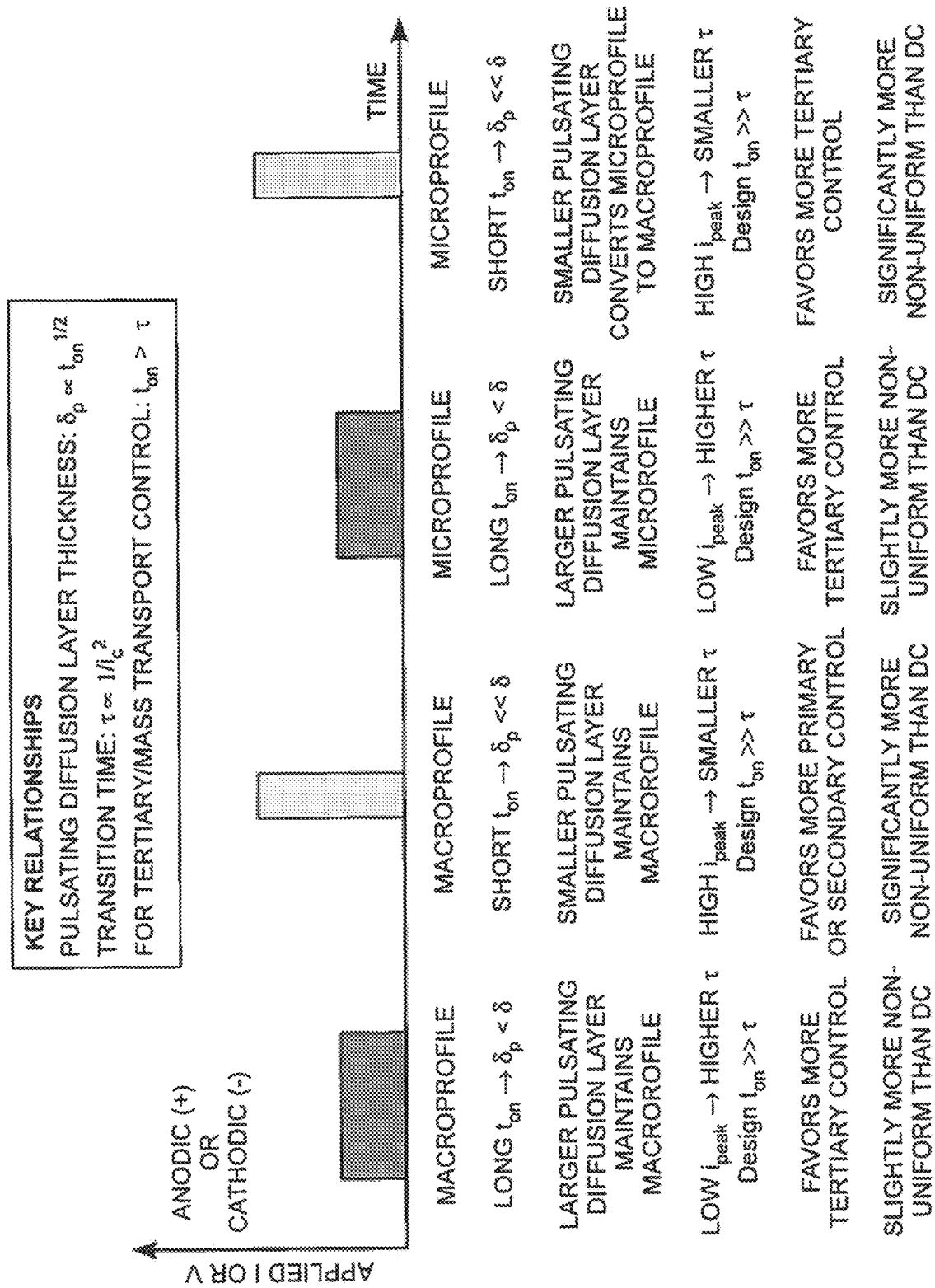
FIG. 4 are guidelines for designing pulse parameters as a function of macroprofile/microprofile and need for more uniformity or more non-uniformity.

A paradigm was developed for waveform parameter selection in terms of current distribution for macroprofile and microprofile condition. There are four pulse waveform types, independent of anodic or cathodic orientation that we generally use to tune waveforms for specific applications, and these are summarized in FIG. 4.

Due to the large roughness scales encountered in additively manufactured parts, generally the boundary layer conforms to the surface and represents a macroprofile. As the roughness of the workpiece decreases during processing, the thickness of the boundary layer remains the same. If the anodic voltage is applied in short pulses, the Nernst diffusion layer will be thinner than it is under DC electrolysis conditions, because the full thickness of the layer does not have time to develop before the pulse terminates. Consequently, a macroprofile condition can be converted into a smaller macroprofile condition, thereby removing the degree of concentration polarization or secondary current distribution. As a general rule the shorter the pulse used, the more the current distribution is determined by the electrode geometry (primary current distribution controlled by ohmic effects) and variation in overpotential due to electrode profile (secondary current distribution controlled by kinetic effects). In fact, depending on the size of the asperity, the role of electrochemical cell geometry may by minimal. In either case, when polarization is removed, i.e., from concentration to secondary and/or primary, the current distribution becomes more non-uniform. Accordingly, metal will be removed preferentially at the peaks of the macroasperities whereby the surface is smoothed on a macroscopic level. When the macroasperities become microasperities, the distribution of the electrolytic activity is influenced by the rate of mass transfer through the diffusion layer, which causes the effect of the electric current to be more uniform (tertiary current distribution). Consequently, smoothing of a surface with microasperities requires a long anodic pulse on-time, or even a DC field is sufficient in cases where there is no need for a reversing pulse as taught in U.S. Pat. No. 3,654,116 incorporated herein by this reference.

In summary, the Nernst diffusion layer thickness is constant during surface finishing. Additionally, the surface asperities are becoming smaller during surface finishing. In the initial stages of surface finishing, the relationship of the Nernst diffusion layer thickness to the surface asperities represent a macroprofile. Depending on the final surface roughness required, at the conclusion of the surface finishing process, the relationship of the Nernst diffusion layer thickness to the surface asperities is either a smaller macroprofile or a microprofile. Due to the changes in the relationship of the Nernst diffusion layer thickness to the surface asperities during processing, the need to adjust the waveform parameters will arise in order to achieve the desired final surface finish with minimal material removed. Combining multiple waveforms into multiple successive sequences may also be required, as will be shown in the examples to follow. This can be accomplished with modern programmable rectifiers—rather than having to modify electrolytes or electrode geometries to achieve the same effect. For cases where the final relationship between the Nernst diffusion layer thickness and the surface asperities represents a macroprofile, the anodic on-times are decreased with each successive waveform sequence. For cases where the final relationship between the Nernst diffusion layer thickness and the surface asperities represent a microprofile, the anodic on-time is greater than the anodic on-times of any of the preceding steps.

The anodic pulse voltages are material specific and determined by measurements of current as a function of voltage to determine the breakdown voltage as indicated by the rapidly rising current. The cathodic voltage is also material specific and is required to remove an oxide film formed during the application of the anodic voltage as described in U.S. Pat. No. 6,402,931 incorporated herein by this reference. The anodic and cathodic voltages are adjusted to account for the distance between the workpiece and the tool.

Example 1

Figure 5:
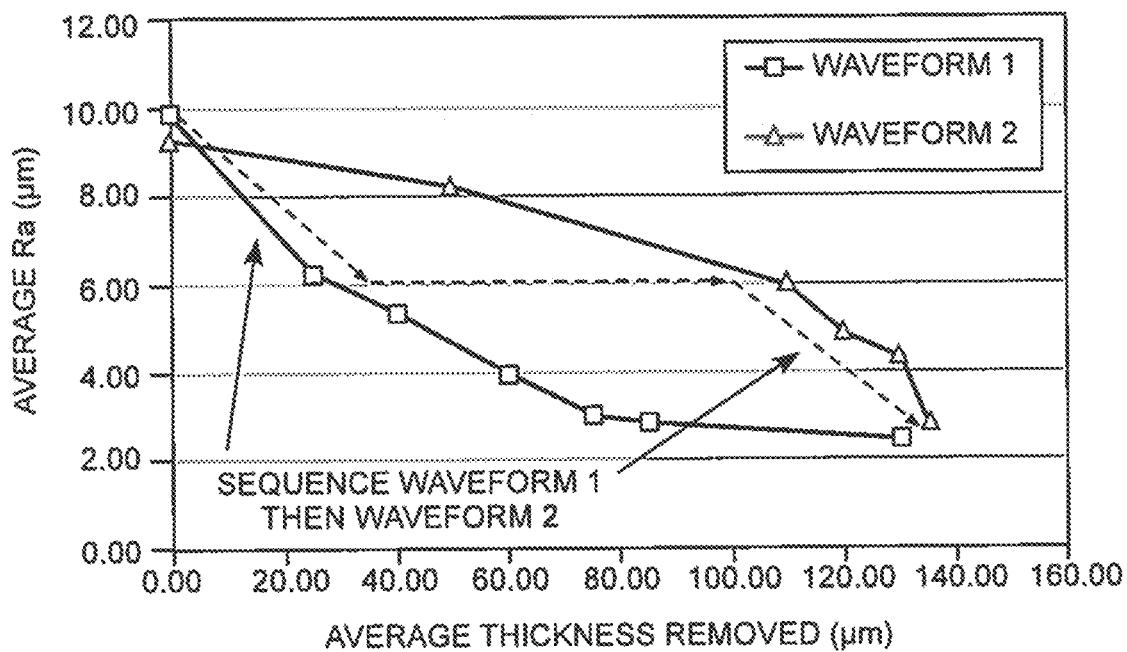
FIG. 5 is a plot of average surface finish versus average thickness of material removed for Waveform 1 and Waveform 2.

In this example, two waveforms were applied for electrofinishing of coupons of HASTELLOY® X. The parameters of the waveforms are presented in TABLE I. The initial surface roughnesses of the coupons as measured by $R_a$ was approximately 10 μm (390 μin). After processing to a desired final surface finish of approximately 2 μm (80 μin), both Waveform 1 and Waveform 2 removed approximately 140 μm (5,500 μin) of material as shown in FIG. 5. The time for processing with Waveform 1 was 7 min and for Waveform 2 was 4 min. As noted from FIG. 5, Waveform 1 exhibited a large $\Delta R_a/\Delta$material during the surface finish range of 10 μm (390 μin) to 6 μm (240 μin) $R_a$. As noted from FIG. 5, Waveform 2 exhibited a large $\Delta R_a/\Delta$material during the surface finish range of 6 μm (240 μin) to 2 μm (80 μin) $R_a$.

TABLE 1

| | $V_{anodic}$ (V) | $t_{anodic}$ (msec) | $t_{anodic,\ off}$ (msec) | $V_{cathodic}$ (V) | $t_{cathodic}$ (msec) | $t_{cathodic,\ off}$ (msec) |
|---|---|---|---|---|---|---|
| Waveform 1 | 40 | 0.1 | 0 | 30 | 0.1 | 0 |
| Waveform 2 | 40 | 0.7 | 0 | 20 | 0.5 | 0 |

In TABLE II presents the results of processing with Waveform 1 and Waveform 2 individually and with an example sequence as described in the instant invention. By sequencing from Waveform 1 for 4 minutes followed by Waveform 2 for 1 minutes, the surface roughness was reduced from 10 μm (390 μin) to approximately 2 μm (80 μin) with only 80 μm (3,150 μin) of material removed. Consequently, in this example, by sequencing the waveform, the amount of material removed was only approximately 60% of the material removed using either Waveform 1 or Waveform 2 separately.

TABLE II

| | Waveform 1 Time (min) | Waveform 2 Time (min) | Initial $R_a$ (μ/μin) | Final $R_a$ (μm/μin) | Material Removed (μm/μin) |
|---|---|---|---|---|---|
| Waveform 1 | 7 | | 9.3/366 | 2.5/98.43 | 135/5114 |
| Waveform 2 | | 4 | 12.8/504 | 2.4/95 | 180/7086 |
| Waveform 1 + Waveform 2 | 4 | 1 | 7.1/280 | 1.1/43 | 80/3150 |

Example 2

In this example, two waveform sequences were applied with different allotted times for electrofinishing of coupons of Ti6Al4V. The parameters of the waveforms used in the sequences are presented in TABLE III. The beginning surface roughnesses of the coupons as measured by $R_a$ was approximately 7 μm (275 μin). The waveform sequences consisted of Waveform 3 followed by Waveform 4 followed by Waveform 5. The data from Trial A are presented in TABLE IV. With the waveform sequence in Trial A, the initial surface roughness was 7.0/276 (μm/μin) $R_a$ and the final surface roughness was 1.98/78 (μm/μin) Re with material removed of 664/26141 (μm/μin).

TABLE III

| | $V_{anodic}$ (V) | $t_{anodic}$ (msec) | $t_{anodic,\ off}$ (msec) | $V_{cathodic}$ (V) | $t_{cathodic}$ (msec) | $t_{cathodic,\ off}$ (msec) |
|---|---|---|---|---|---|---|
| Waveform 3 | 6 | 0.5 | 0 | 12 | 0.7 | 0 |
| Waveform 4 | 6 | 0.3 | 0 | 12 | 0.6 | 0 |
| Waveform 5 | 6 | 0.2 | 0 | 12 | 0.4 | 0 |

TABLE IV

TRIAL A

| | Processing Time (hr) | Initial $R_a$ (μm/μin) | Final $R_a$ (μm/μin) | Material Removed (μm/μin) | Total Material Removed (μm/μin) |
|---|---|---|---|---|---|
| Waveform 3 | 4 | 7.0/276 | 4.9/193 | 266/10472 | |
| Plus | | | | | |
| Waveform 3 | 2 | 4.9/193 | NA | NA | |
| Waveform 4 | 2 | NA | 3.7/126 | 233/9173 | 499/19645 |
| Plus | | | | | |
| Waveform 4 | 6 | 3.7/126 | NA | NA | |
| Waveform 5 | 2 | NA | 1.98/78 | 165/6496 | 664/26141 |
| | | | | | 664/26141 |

Based on the data obtained during Trial A, the respective time of the waveform sequence was adjusted in order to minimize the amount of material removed as presented in TABLE V for Trial B. With the waveform sequence in Trial B, the initial surface roughness was 6.6/260 (μm/μin) $R_a$ and the final surface roughness was 1.7/67 (μm/μin) $R_a$ with material removed of 152/5984 (μm/μin). By adjusting the time of the individual components of the waveform sequence, we achieved an acceptable final surface finish with approximately 23% of the material removed in Trial A.

TABLE V

TRIAL B

| | Processing Time (hr) | Initial $R_a$ (μm/μin) | Final $R_a$ (μm/μin) | Material Removed (μm/μin) | Total Material Removed (μm/μin) |
|---|---|---|---|---|---|
| Waveform 5 | 4 | 6.6/260 | NA | NA | |
| Waveform 3 | 3 | NA | 4.8/189 | 71/2795 | 71/2795 |
| Plus | | | | | |
| Waveform 4 | 3 | NA | 3.4/130 | 26/1023 | 97/3818 |
| Plus | | | | | |
| Waveform 5 | 5.1 | 3.4/130 | 1.7/67 | 55/2165 | 152/5984 |
| | | | | | 152/5984 |

Example 3 [IN718]

Figure 6:
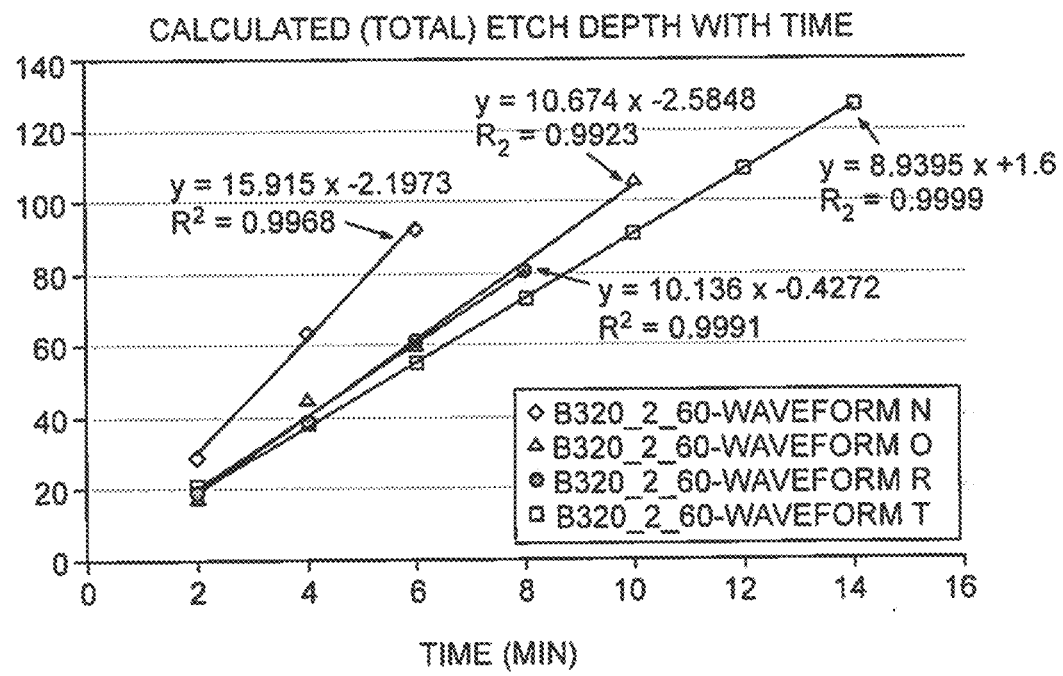
FIG. 6 presents the calculated etch depth as a function of time and waveform for sample B320_2_60 using 10% $H_2SO_4$ solution.
Figure 7:
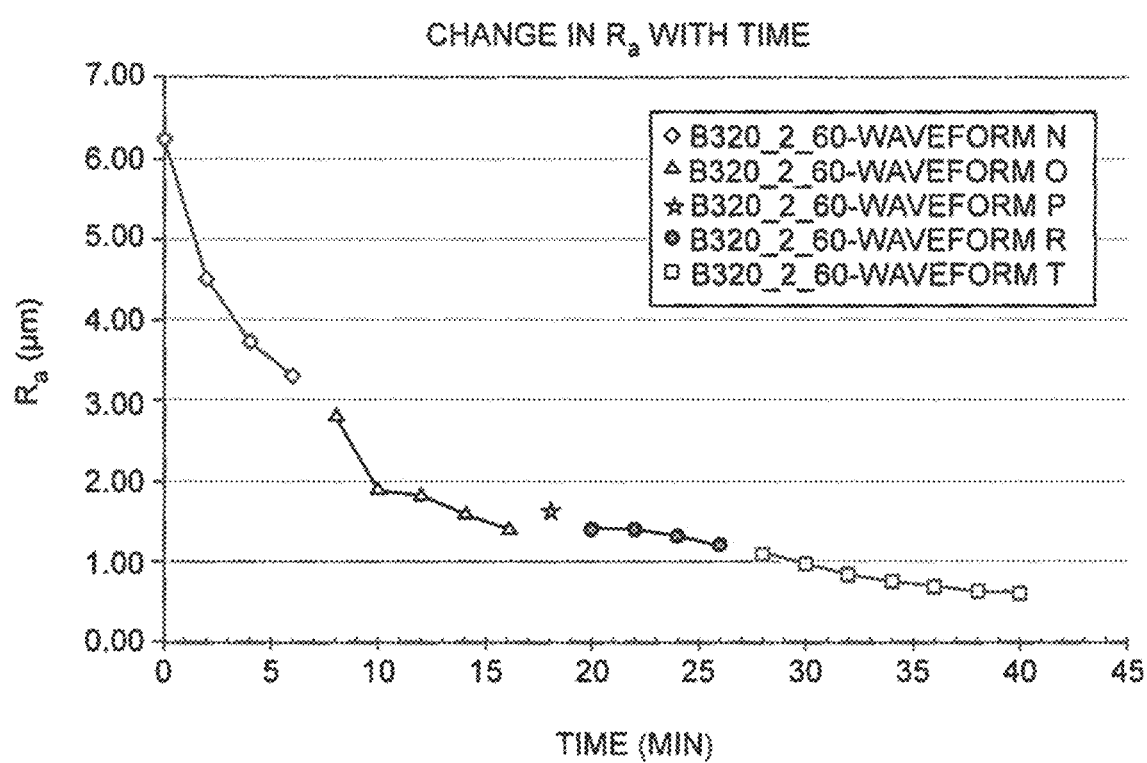
FIG. 7 illustrates the change in surface roughness ($R_a$) as a function of time and waveform for sample B320_2_60 in a 10% $H_2SO_4$ solution.
Figure 8:
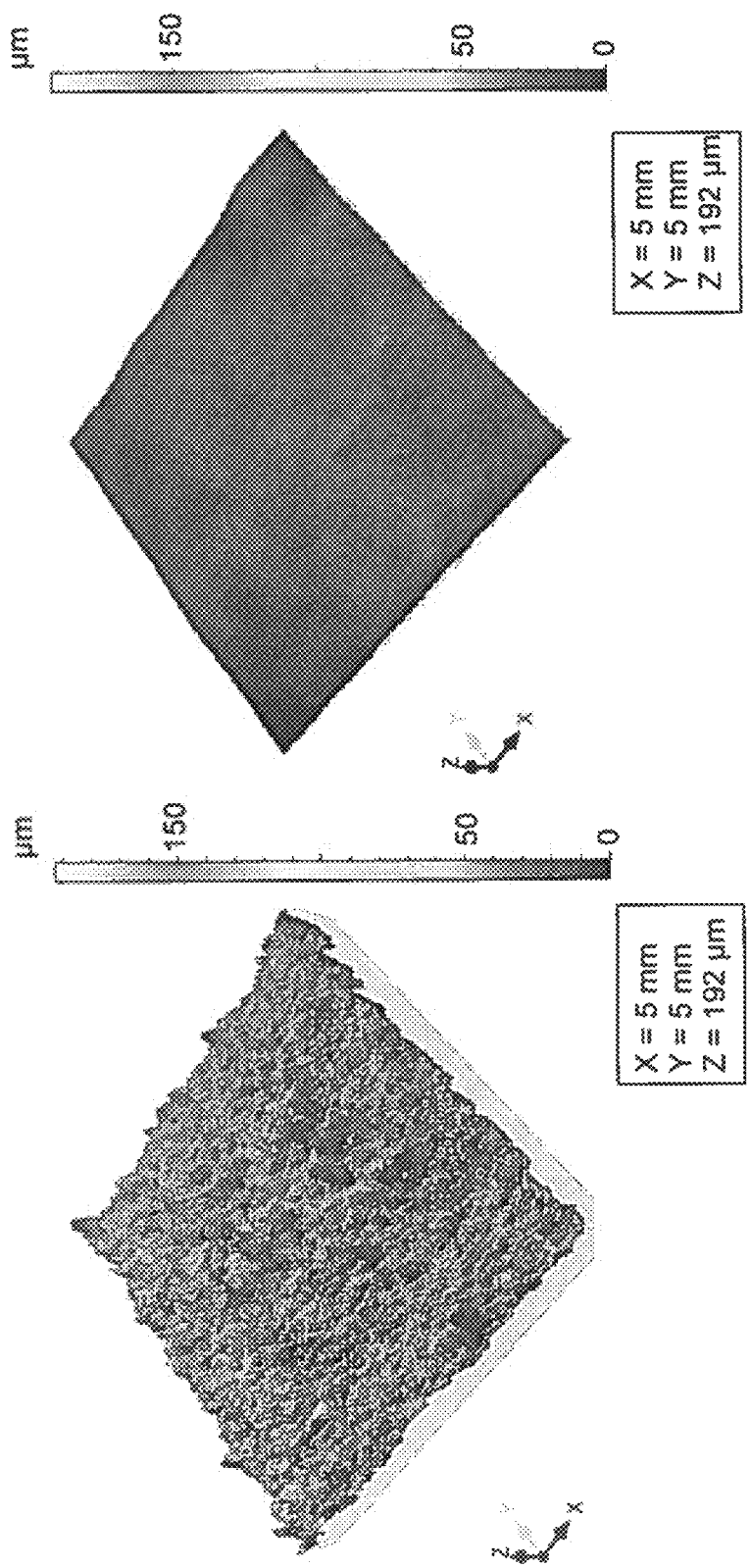
FIG. 8 are 3D surface maps of IN 718 sample B320_2_60 before processing (left) and after processing with waveform sequence for 40 minutes (total) in 10% $H_2SO_4$ solution.
Figure 9:
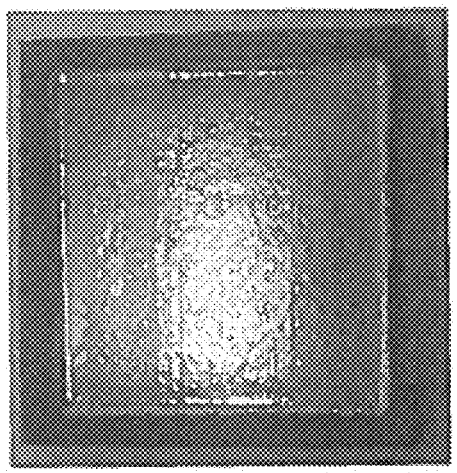
FIG. 9 are photographs showing polishing evolution from sample B320_2_60 using waveform sequence in 10% $H_2SO_4$.
Figure 9:
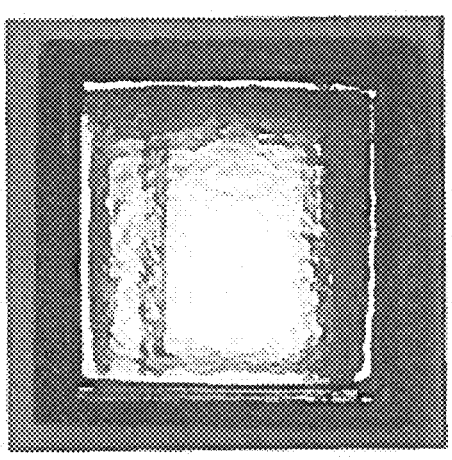
Figure 9:
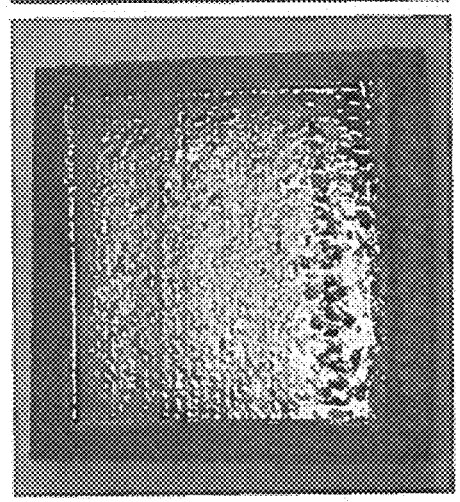
Figure 9:
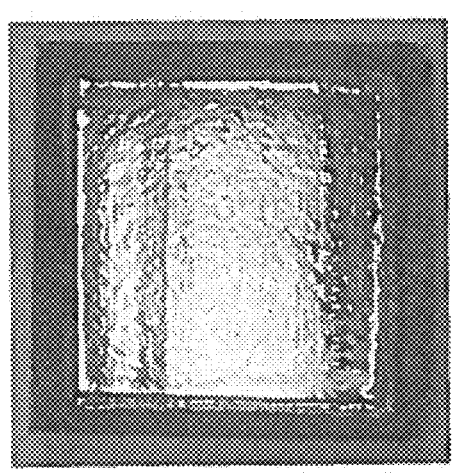
Figure 9:
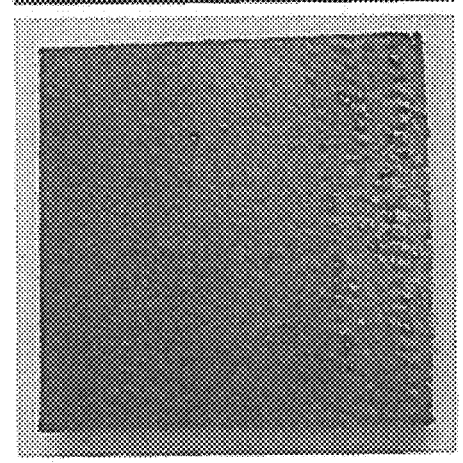
Figure 9:
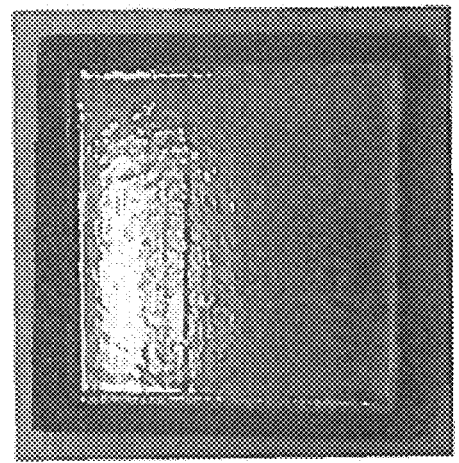

Electropolish of sample B320_2_60 was processed with the waveforms developed for EMB HIP IN 718 coupon B315_2_60 using 10% (w/w) $H_2SO_4$ electrolyte. For this coupon, Faraday varied the applied time for each of the five waveforms to enable development of an appropriately timed waveform sequence. As such, Faraday began polishing the SLM HIP IN 718 surfaces using the conditions of waveform N, pulling the sample every two minutes to evaluate the surface roughness, and mass loss. The data collected for this sample is presented in TABLE VI. FIGS. 6 and 7 show the calculated etch depth with time and change in $R_a$ with time, respectively. The 3D images collected from the Nanovea optical profilometer are given for this sample in FIG. 8, including initial surface and surface after processing with the waveforms outlined in TABLE VII, and sample photographs showing the polishing evolution is given in FIG. 9.

TABLE VI

| | $V_{anodic}$ (V) | $ta_{nodic}$ (msec) | $t_{anodic,\ off}$ (msec) | $V_{cathodic}$ (V) | $t_{cathodic}$ (msec) | $t_{cathodic,\ off}$ (msec) |
|---|---|---|---|---|---|---|
| Waveform N | 10 | 6.0 | 1.0 | 12 | 5.0 | 0 |
| Waveform O | 10 | 1.2 | 1.0 | 12 | 1.0 | 0 |
| Waveform P | 10 | 0.6 | 1.0 | 12 | 0.5 | 0 |
| Waveform R | 10 | 0.6 | 0 | 10 | 0.5 | 0 |
| Waveform T | 10 | 0.75 | 0.5 | 12 | 0.6 | 0 |

TABLE VII

Data generated for sample B320_2_60 processed under FARADAYIC® Electropolishing conditions in 10% $H_2SO_4$ solution.

| | | Optical | | Contact | | | | |
|---|---|---|---|---|---|---|---|---|
| Sample ID B320_2_60 | Calculated Depth (μm) | $R_a$ (μm) x-axis | $R_a$ (μm) y-axis | $R_a$ (μm) y-axis | EAVE (V) | Freq (Hz) | Time (min) | Rate (μm/min) |
| Initial Surface | — | 5.23 | 7.39 | 6.24 | — | — | — | — |
| After waveform N | 92 | — | — | 3.31 | 0.0 | 83 | 6 | 15 |
| After waveform O | 106 | — | — | 1.40 | 0.0 | 313 | 10 | 11 |
| After waveform P | 30 | — | — | 1.63 | 0.0 | 541 | 2 | 15 |
| After waveform R | 81 | — | — | 1.21 | 0.0 | 476 | 8 | 10 |
| After waveform T | 127 | 0.643 | 0.745 | 0.61 | 0.0 | 541 | 14 | 9 |

The conditions developed for polishing EMB HIP IN 718 coupons in 10% (w/w) $H_2SO_4$ appear to also be valid for the polishing of SLM HIP IN 718 coupons in 10% (w/w) $H_2SO_4$. After application of this waveform sequence, the surface of the SLM HIP IN 718 coupon is smoothed and has a bright, reflective and lustrous appearance. From the data presented in TABLE VII, the application of Waveform P did not improve the surface finish, at least in the order at which it was applied. The data collected from coupon B320_2_60 was used to generate a waveform sequence, included applied times for each waveform for an uninterrupted polishing step.

Example 4 [Ti6Al4V]

In this example, three waveforms of identical anodic and cathodic voltages with varying frequencies were applied to uniformly remove material from the internal surface of a tapered rounded rectangular Ti6Al4V AM component. The parameters of the waveforms used for improved etch uniformity of AM Ti6Al4V are presented in TABLE VIII in a 30 w/w % $H_2SO_4$/150 g/L $Na_2SO_4$ electrolyte.

TABLE VIII

| | $V_{anodic}$ (V) | $t_{anodic}$ (msec) | $t_{anodic,\ off}$ (msec) | $V_{cathodic}$ (V) | $t_{cathodic}$ (msec) | $t_{cathotic,\ off}$ (msec) |
|---|---|---|---|---|---|---|
| High f | 4 | 0.2 | 1 | 8 | 0.4 | 0 |
| Mid f | 4 | 0.8 | 5 | 8 | 1.6 | 0 |
| Low f | 4 | 1.2 | 5 | 8 | 2.0 | 0 |

Figure 10:
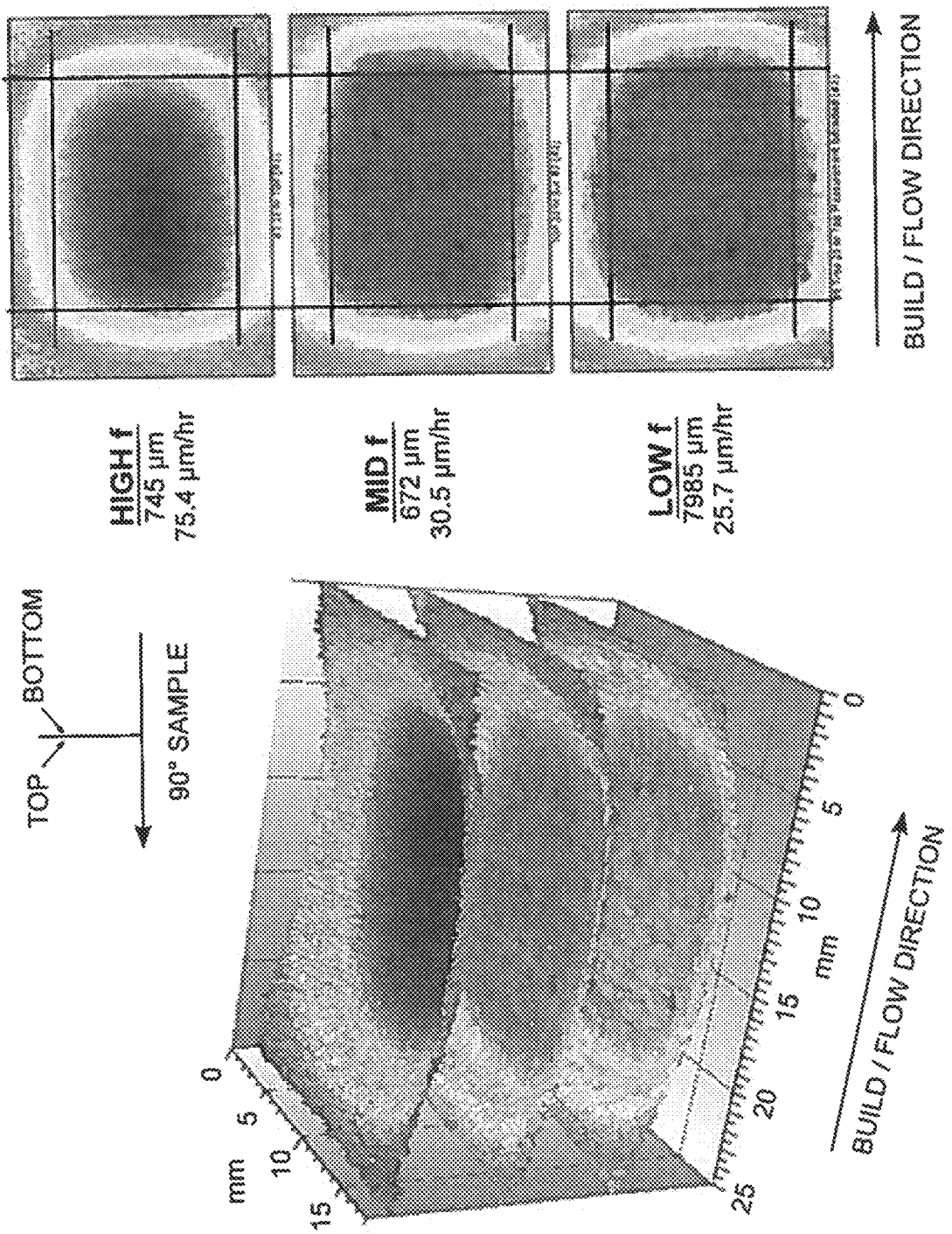
FIG. 10 is the etch profile (Blue is deep, Red is shallow) found when finishing AM Ti6Al4V in 30 w/w % $H_2SO_4$ and 150 g/L $Na_2SO_4$ electrolyte with the conditions shown in TABLE V.

The effect of these processing conditions is highlighted in FIG. 10, which show the depth of etch as a function of the process frequency and the position of the electrodes for Ti6Al4V. The data in FIG. 10 demonstrates that as the frequency increases the majority of material removal focusing in the region of the 10×18 mm tool.

Example 5 [IN718]

In this example, we applied three waveforms of identical anodic and cathodic voltages with varying frequencies to uniformly remove material from the internal surface of a tapered rounded rectangular Inconel IN718 AM component. The parameters of the waveforms used for improved etch uniformity of AM IN718 Inconel are presented in

TABLE IX in a 0.23M HCl and 0.23M Citric Acid Solution.

| | $V_{anodic}$ (V) | $t_{anodic}$ (msec) | $t_{anodic,\ off}$ (msec) | $V_{cathodic}$ (V) | $t_{cathodic}$ (msec) | $t_{cathodic,\ off}$ (msec) |
|---|---|---|---|---|---|---|
| High f | 3 | 5 | 0 | 3 | 10 | 0 |
| Mid f | 3 | 10 | 0 | 3 | 20 | 0 |
| Low f | 3 | 20 | 0 | 3 | 40 | 0 |

Figure 11:
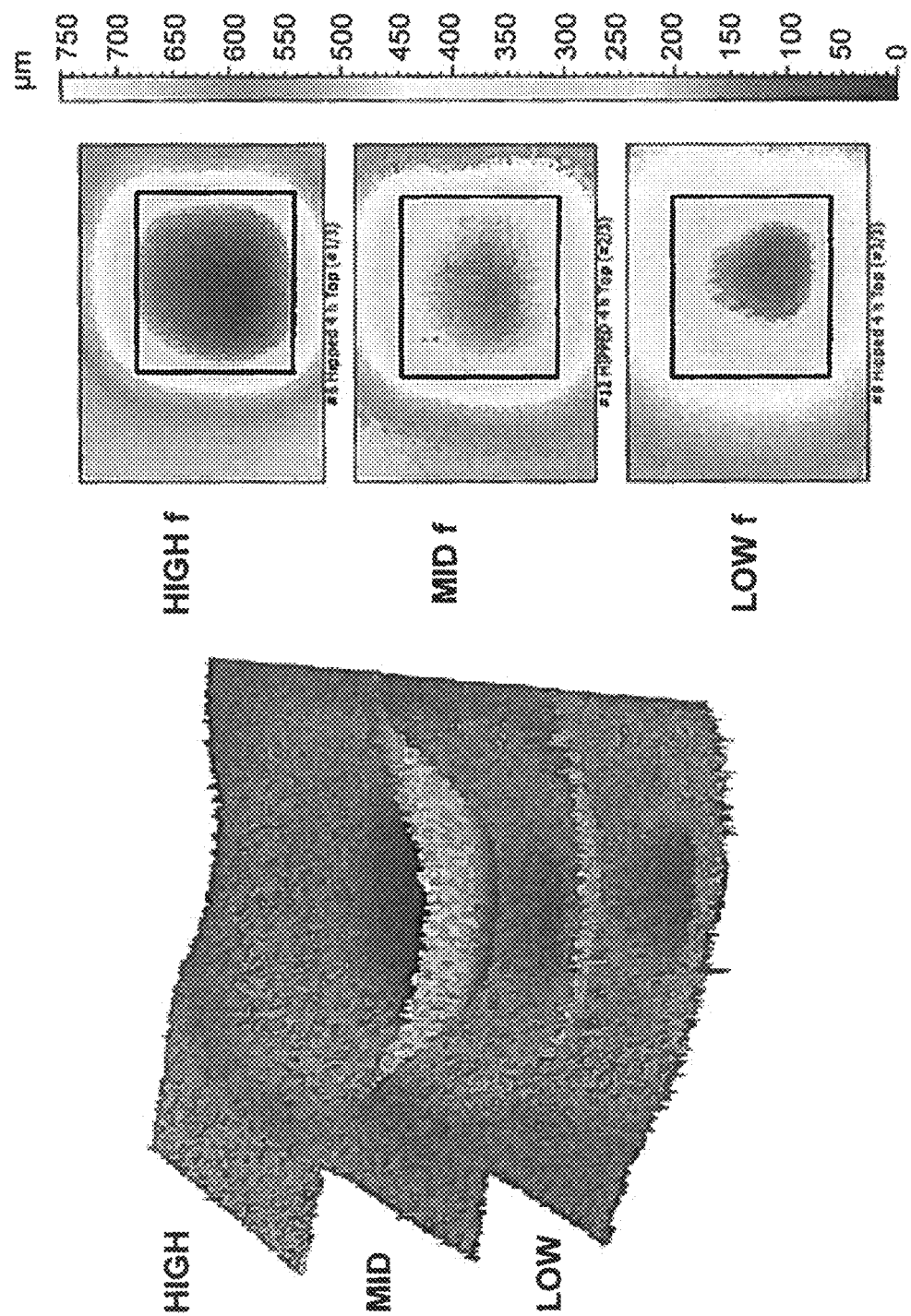
FIG. 11 is the etch profile (Blue is deep, Red is shallow) found when finishing AM Inconel 718 in 0.23 M HCl and 0.23 M Citric Acid electrolyte with the conditions shown in TABLE VII.

The effect of these processing conditions is highlighted in FIG. 11, which show the depth of etch as a function of the process frequency and the position of the electrodes for Inconel 718. The data in FIG. 11 demonstrates that as the frequency decreases the majority of material removal focuses in the region of the 10×13 mm tool.

Figure 12:
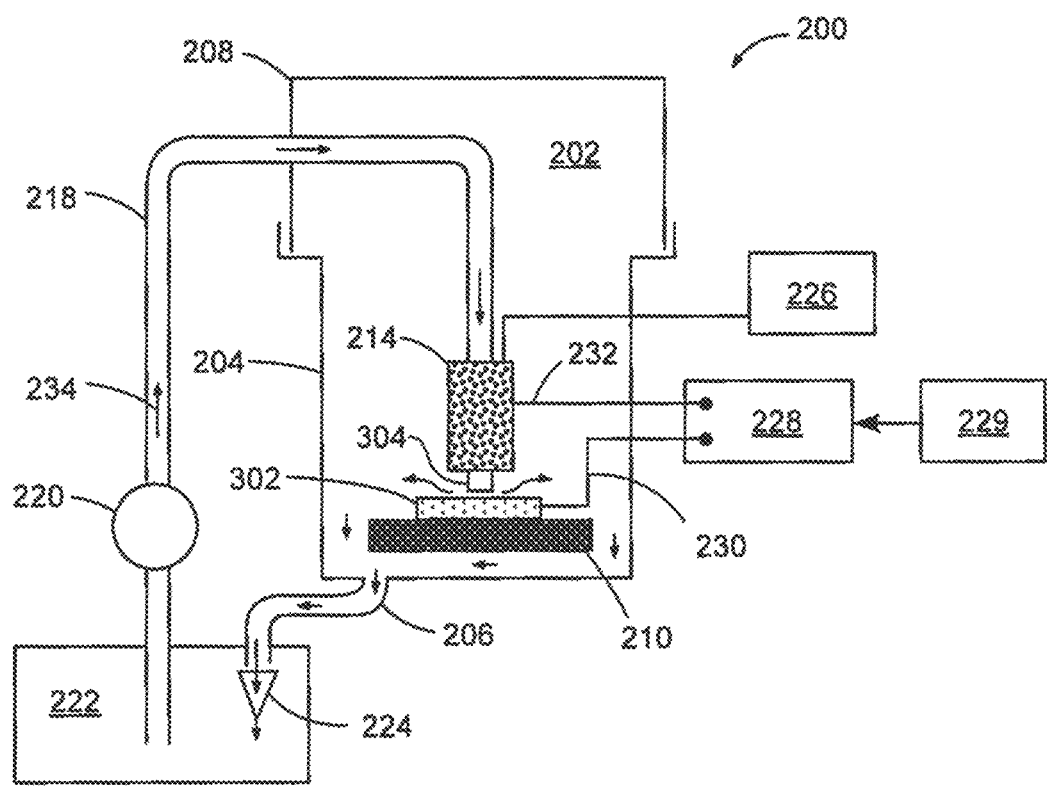
FIG. 12 is a view of an example of an electrochemical surface finishing system in an example of the invention.

One particular implementation of the disclosed electrochemical surface finishing system may include a working chamber 202, FIG. 12, defined by a tank 204 and a cover 208, an electrolyte holding tank 222, a conduit 218, a pump 220, an electrode 304, part 302, a power source 228 and the electrolyte solution. The working chamber 202 may be in fluid communication with the electrolyte holding tank 222 by way of a gravity drain 206. A filter 224 may be associated with the drain 206 to filter the electrolyte solution flowing from the working chamber 202 to the electrolyte holding tank 222. The working chamber 202 may also be fluid communication with the electrolyte holding tank 222 by way for the conduit 218, wherein the pump 220 may pump the electrolyte solution from the electrolyte holding tank 222 to the working chamber 202, as shown by arrow 234.

Within the working chamber 202, a workpiece holder 210 may be mounted near the bottom of the tank 204 with adequate spacing from the walls and bottom of the tank 204 to allow for drainage of the electrolyte solution into the electrolyte holding tank 222. The AM part 302 may be supported on the workpiece holder 210 and may be connected to a first electrical lead 230 of pulse/pulse reverse power supply 228 rendering the part anodic. In this way, metal is dissolved from the AM part during energizing of the pulse/pulse reverse power supply to employ the waveforms discussed above.

An electrode holder 214 may be positioned in the working chamber 202 above the workpiece holder 210. The electrode holder 214 may be supplied with the electrolyte solution by way of the conduit 218. The electrode 304 may be connected to a second electrical led 232 (opposite polarity than the first electrical lead 230) of the power source 228 and may be supported by the electrode holder 214 such that the tool holder 214 may move the electrode 304 in a vertical axis under control of an electrode feed controller 226. Thus, electrode 304 is rendered cathodic.

In one particular aspect, the electrode 304 may include a central bore and the electrode 304 may be connected to the electrode holder 214 such that the central bore of the electrode 304 is directed at the workpiece 302. During electrochemical surface finishing, the electrolyte solution may be pumped by pump 220 from the electrolyte holding tank 222 to the electrode holder 214 and, ultimately, to the electrode 304 by way of the conduit 218. The rate of the electrolyte solution flow is herein referred to as E. The electrolyte solution may flow through the central bore of the electrode 304 and may exit between the electrode 304 and the part 302 before returning to the electrolyte holding tank 222 by way of the drain 206. The power source 228 may supply electric current to the workpiece 302 and the electrode 304 by way of the first and second electrical leads 230, 232 in accordance with the disclosed anodic pulse-cathodic pulse waveform. The power source may be configurable to apply the waveform(s) described herein or may be controlled by controller subsystem 229 to apply the waveform(s). Controller subsystem 229 may execute instructions stored in memory and configured to apply the disclosed waveform(s). Controller subsystem 229 may be a laptop or other computer, an application specific integrated circuit, microcontroller, field programmable gate array, or the like.

The spacing between the electrode and part 302 during processing may be considered a parameter subject to optimization and may depend on the composition of the electrolyte solution and the type of electrochemical process being performed, among other factors. For example, the spacing between the electrode and workpiece may range from about 0.5 to 20 millimeters or more particularly 0.5 to 10 millimeters for an electrochemical shaping process, about 5 to about 12 millimeters for an electrochemical polishing process and about 5 to about 50 millimeters for an electrochemical deburring process.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A method of surface finishing, the method comprising:
providing an additive manufactured part;
placing the additive manufactured part having a surface roughness with macroasperities in the chamber with an electrolyte and an electrode;
connecting a pulse/pulse reverse power supply to the part rendering it anodic and to the electrode rendering it cathodic; and
operating the power supply to decrease the surface roughness of the part by:
applying a first series of waveforms including at least two waveforms where a diffusion layer is maintained at a thickness to produce a macroprofile regime relative to the macroasperities, the first series of waveforms having anodic voltages applied for anodic time periods before cathodic voltages applied for cathodic time periods to effect part surface smoothing to a first surface roughness, and
applying a final waveform where the diffusion layer represents a microprofile regime, the final waveform having a final anodic voltage applied for a final anodic time period before a final cathodic voltage applied for a final cathodic time period to effect part surface smoothing to a final surface roughness;
in which the anodic voltages of the first series of waveforms are between 3 volts and 40 volts, the cathodic voltages of the first series of waveforms are between 4 volts and 30 volts; and
in which the first surface roughness is between 5 microns and 50 microns, the final surface roughness is between 0.5 microns and 15 microns and the total amount of material removed is between 50 microns and 250 microns.

2. The method of claim 1 in which the first series of waveform times is between 1 millisecond and 100 milliseconds, and the final waveform time is between 1 millisecond and 100 milliseconds.

3. The method of claim 1 in which the first series of waveform anodic time periods are between 0.1 millisecond and 50 millisecond and the final anodic time period is between 50 milliseconds and 100 milliseconds.

* * * * *